US009294306B2

(12) United States Patent
Brahmanapalli (10) Patent No.: US 9,294,306 B2
(45) Date of Patent: Mar. 22, 2016

(54) INTELLIGENT PREVENTION OF SPAM EMAILS AT SHARE SITES

(75) Inventor: Syed Saleem Javid Brahmanapalli, Richmond, CA (US)

(73) Assignee: Shutterfly, Inc., Redwood City, CA (US)

(*) Notice: Subject to any disclaimer, the term of this patent is extended or adjusted under 35 U.S.C. 154(b) by 759 days.

(21) Appl. No.: 13/406,140

(22) Filed: Feb. 27, 2012

(65) Prior Publication Data
US 2012/0233271 A1 Sep. 13, 2012

Related U.S. Application Data (60) Provisional application No. 61/451,702, filed on Mar. 11, 2011.

(51) Int. Cl.
G06F 15/16 (2006.01)
H04L 12/58 (2006.01)
(52) U.S. Cl.
CPC .................................. H04L 12/585 (2013.01)
(58) Field of Classification Search
CPC ...................................................... H04L 12/585
USPC ........................................................ 709/206
See application file for complete search history.

(56) References Cited

U.S. PATENT DOCUMENTS

| 7,249,162 | B2* | 7/2007 | Rounthwaite et al. | 709/206 |
|---|---|---|---|---|
| 7,640,313 | B2* | 12/2009 | Rounthwaite et al. | 709/206 |
| 7,640,589 | B1* | 12/2009 | Mashevsky et al. | 726/24 |
| 8,271,603 | B2* | 9/2012 | Wilson et al. | 709/207 |
| 9,015,130 | B1* | 4/2015 | Michaelis et al. | 707/689 |
| 9,021,028 | B2* | 4/2015 | Smith et al. | 709/206 |
| 2005/0204159 | A1* | 9/2005 | Davis et al. | 713/201 |
| 2006/0095966 | A1* | 5/2006 | Park | 726/22 |
| 2012/0188169 | A1* | 7/2012 | Yankovich et al. | 345/173 |
| 2012/0215861 | A1* | 8/2012 | Smith et al. | 709/206 |

OTHER PUBLICATIONS (http://web.archive.org/web/20090710023600/http://www.shutterfly.com/howto/share_site/invite.jsp, Jul. 10 and 11, 2009).*

* cited by examiner

Primary Examiner — Shirley Zhang
(74) Attorney, Agent, or Firm — Xin Wen (57) ABSTRACT

A computer-implemented method for preventing spam emails from a share site includes providing a network-based computer system to enable users to set up share sites and to send emails from the share sites, detecting potential spam emails based on one or more spam detection rules, identifying false positive emails in the potential spam emails based on one or more false alarm reduction rules, removing false positive emails from the potential spam emails to produce a list of verified spam emails, identifying a sender of the list of verified spam emails as a spammer, and prohibiting the spammer from sending emails from one or more share sites owned spammer.

20 Claims, 8 Drawing Sheets

INTELLIGENT PREVENTION OF SPAM EMAILS AT SHARE SITES

CROSS-REFERENCES TO RELATED APPLICATIONS

The present application claims priority to U.S. provisional patent application 61/451,702, titled "Intelligent prevention of spam emails at share sites", filed by the same inventors on Mar. 11, 2011, the content of which is incorporated herein by reference.

BACKGROUND OF THE INVENTION

Web-based service providers such as Shutterfly, Inc. provide share sites for users to share their photos, videos, and remarks. To register, a user is only required to provide an email address and a password. The user is then allowed to set up share sites. The owner of a share site can send emails to invite people to become members of the share site, or announce publication of new content at the share site. These features are usually free of charge.

It is found, unfortunately, that the share sites have been used increasingly as a platform by spammer to send spam emails. A spammer signs up at the service provider and sets up a share site, and then uses the email service of the share site to send spam messages. The spammer usually does not upload or publish content at the share site because it is not required.

The spam emails have caused significant negative impact on the services of the share sites and the associated web-based service providers. The email spamming from share sites have alienated users to such a degree that some users have opted out of email communications from the share-site service providers such as Shutterfly, Inc. The handling of customer complaints about email spamming and the removals of spammers' account waste a lot of resources of the service provider's customer service.

Web mail providers such as Google and Yahoo often use semantic-based spam filters to remove spam emails received in users' email accounts. Although this type of anti-spam techniques may be suitable for spam emails received over the Internet, they often cannot provide the most accurate spam prevention for share sites. There is a need for suppressing spam emails at share site with high detection accuracy and low rate of false alarms.

SUMMARY OF THE INVENTION

In one aspect, the present application relates to a method for a computer-implemented method for preventing spam emails from a share site. The method includes providing a network-based computer system to enable users to set up share sites and to send emails from the share sites; storing one or more spam detection rules in the network-based computer system; detecting potential spam emails based on the one or more spam detection rules; storing one or more false alarm reduction rules in the network-based computer system; identifying false positive emails in the potential spam emails based on the one or more false alarm reduction rules; removing false positive emails from the potential spam emails to produce a list of verified spam emails; identifying a sender of the list of verified spam emails as a spammer; and prohibiting the spammer from sending emails from one or more share sites owned spammer.

Implementations of the system may include one or more of the following. The step of detecting potential spam emails based on the one or more spam detection rules can include detecting email messages having substantially identical content. The step of detecting potential spam emails based on the one or more spam detection rules can include determining if substantially identical content in the email messages contain more a predetermined number of words. The step of detecting potential spam emails based on the one or more spam detection rules can include determining if the email messages having substantially identical content are sent from different share site. The step of detecting potential spam emails based on the one or more spam detection rules can include determining if the email messages having substantially identical content exceed a predetermined number. The network-based computer system can include a plurality of servers, wherein the step of detecting potential spam emails based on the one or more spam detection rules can include detecting email messages having substantially identical content at two or more of the plurality of servers. The step of identifying false positive emails in the potential spam emails based on the one or more false alarm reduction rules can include automatically detecting behaviors of a sender of the potential spam emails at the share-site. The step of identifying false positive emails in the potential spam emails based on the one or more false alarm reduction rules can include determining if the sender of the potential spam emails has uploaded images to the network-based computer system. The step of identifying false positive emails in the potential spam emails based on the one or more false alarm reduction rules can include determining if the sender of the potential spam emails has ordered products or services from the network-based computer system. The computer-implemented method can further include allowing the users, by the network-based computer system, to publish text, images, videos, or designs at the share sites.

In another aspect, the present application relates to a network-based computer system for facilitating share sites comprising: one or more servers that can enable users to set up share sites and to send emails from the share sites; a spam intelligence module that can store one or more spam detection rules and to detect potential spam emails based on the one or more spam detection rules, wherein the spam intelligence module configured to store one or more false alarm reduction rules and to identify false positive emails in the potential spam emails based on the one or more false alarm reduction rules, wherein the false positive emails are removed from the potential spam emails to produce a list of verified spam emails; and a spam control module that can identify a sender of the list of verified spam emails as a spammer and to prohibit the spammer from sending emails from one or more share sites owned spammer.

Implementations of the system may include one or more of the following. The spam intelligence module can detect email messages having substantially identical content to detect potential spam emails. The spam intelligence module can detect potential spam emails by determining if the substantially identical content in the email messages contain more a predetermined number of words. The spam intelligence module can detect potential spam emails by determining if the email messages having substantially identical content are sent from different share site. The spam intelligence module can detect potential spam emails by determining if the email messages having substantially identical content exceed a predetermined number. The spam intelligence module can detect potential spam emails by detecting email messages having substantially identical content at two or more of the servers. The spam intelligence module can identify false positive emails by automatically detecting behaviors of a sender of the potential spam emails at the share-site. The spam intelligence module can identify false positive emails by determining if the sender of the potential spam emails has uploaded images to the network-based computer system. The spam intelligence module can identify false positive emails by determining if the sender of the potential spam emails has ordered products or services from the network-based computer system. The one or more servers can enable the users to publish text, images, videos, or designs at the share sites.

Embodiments may include one or more of the following advantages. The disclosed system and methods significantly improve user experience at share sites by reducing or eliminating email spams. The disclosed spam prevention measures can be implemented automatically, thus saving labor and cost. The disclosed system and methods can reduce resources wasted by service providers on manually handling spam emails. The disclosed system and methods also have minimal false positives, thus minimizing impact on legitimate users.

Although the invention has been particularly shown and described with reference to multiple embodiments, it will be understood by persons skilled in the relevant art that various changes in form and details can be made therein without departing from the spirit and scope of the invention.

DETAILED DESCRIPTION OF THE INVENTION

Figure 1:
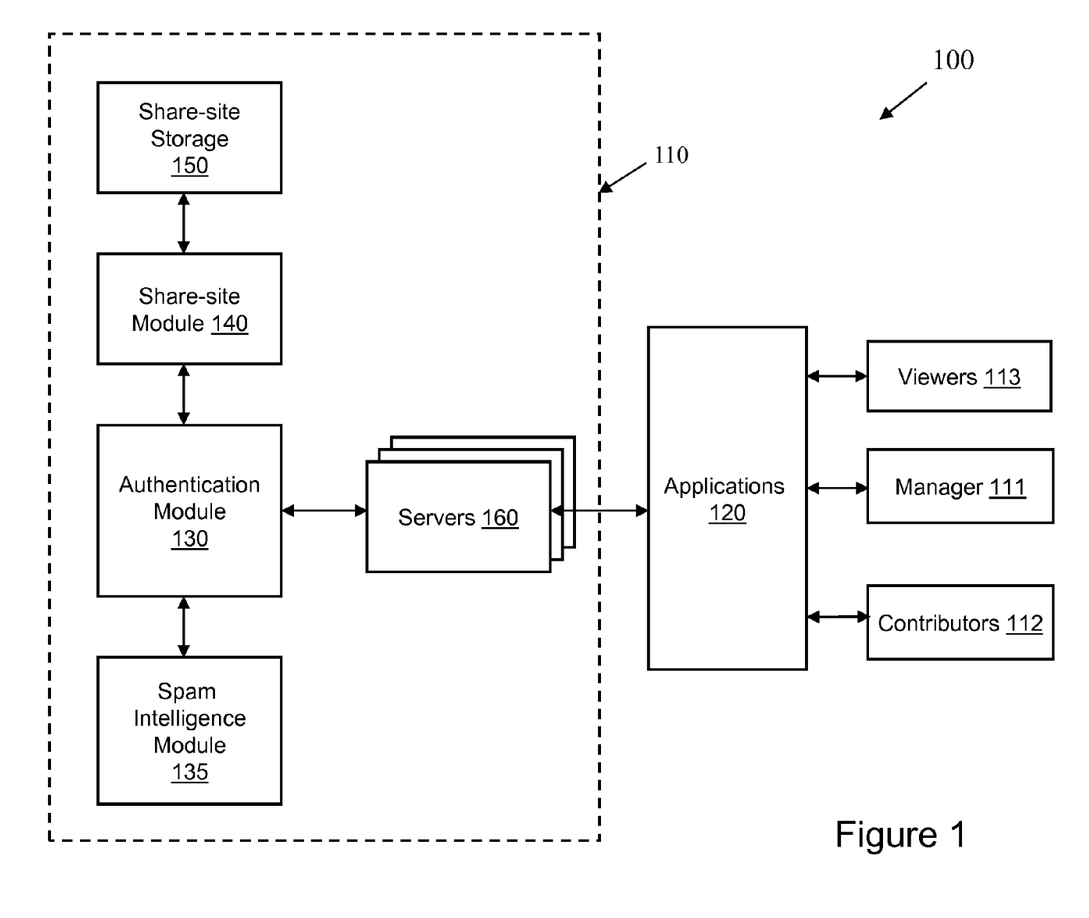
FIG. 1 is a block diagram for a share-site management system in accordance to the present invention.

A network-based computer system 100, as shown in FIG. 1, includes a share-site management system 110 that communicates with users such as a manager 111, contributors 112, and viewers 113 via applications 120. The share site management system 110 includes an authentication module 130, a spam intelligence module 135, a share-site module 140, share-site storage 150, and servers 160 for communicating with applications 120 over a computer network. The authentication module 130 further includes, as shown in FIG. 2, an application authentication module 131, a user authentication module 132, and a user access-control module 133.

Figure 3:
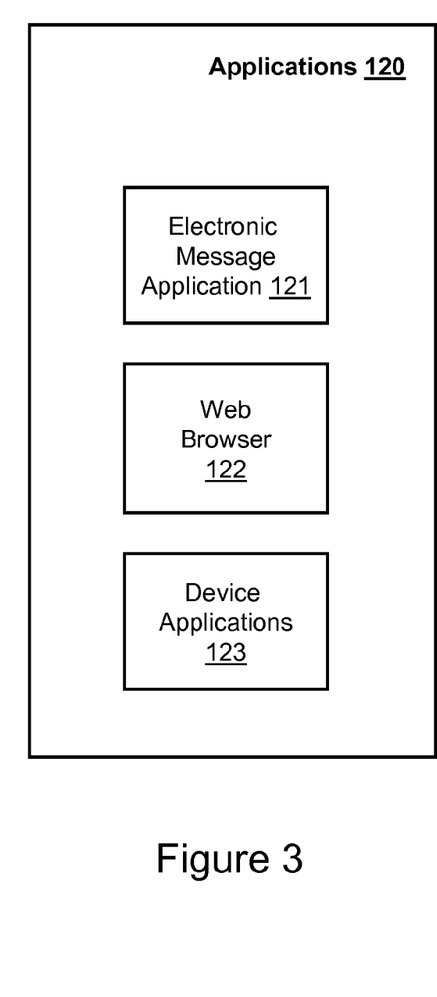
FIG. 3 is a block diagram for applications compatible with the share-site management system of FIG. 1.

Users of the share site management system 110 can have different roles such as manager 111 who is the owner and administrator of the share site, contributors 112, and viewers 113. Users communicate with the share site management system 110 via applications 120 which can publish content at the share site from the share site management system 110 on users' display devices. Examples of content at the web site include text, images, videos, and designs. The applications 120, as shown in FIG. 3, can be implemented in different forms and on different platforms. Applications 120 include web browser and device applications 123 installed on devices such as smart phones, tablet computers, etc. which allow users to access the share sites. Applications 120 can also include electronic message application 121 such as Yahoo mail, gmail, hotmail etc., short messages (SMS), and texting, etc. for the viewers 113 to receive messages from the share-site manager 111 about registration and updated content. In the present application, the term "email" is used to represent different forms of electronic messages.

Figure 2:
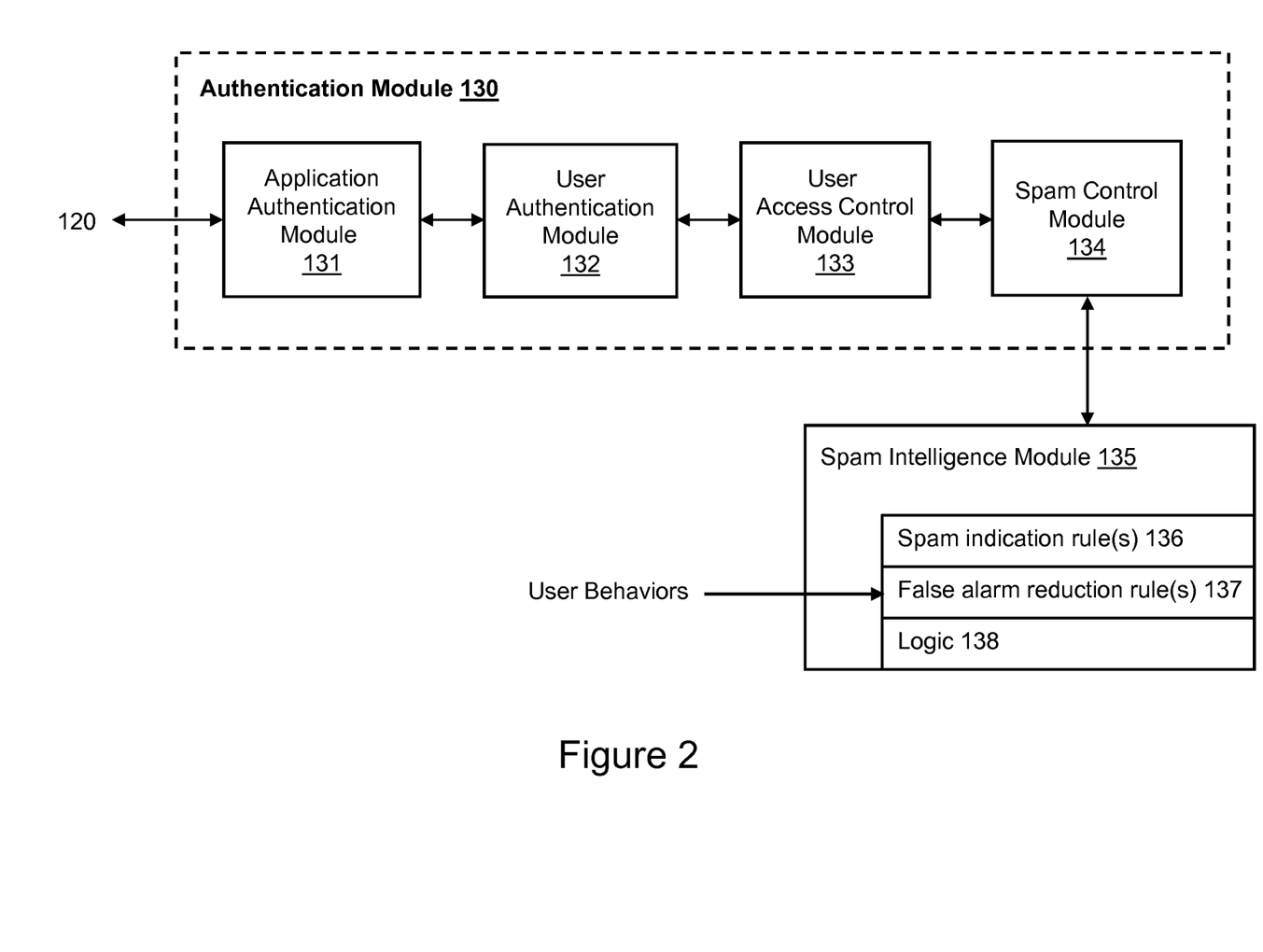
FIG. 2 is a block diagram for an authentication module compatible with the share-site management system of FIG. 1.

Referring to FIGS. 1 and 2, users of the share-site management system 110 are authenticated by the user authentication module 132 and receive user tokens after authentication. Contributors 112 can send digital images and text to the share site management system 110 and to be stored in the share-site storage 150. The manager 111 has the right to organize, edit, design layout for the image, video, and text information of his own or from the contributors for publishing at the share site.

Figure 4:
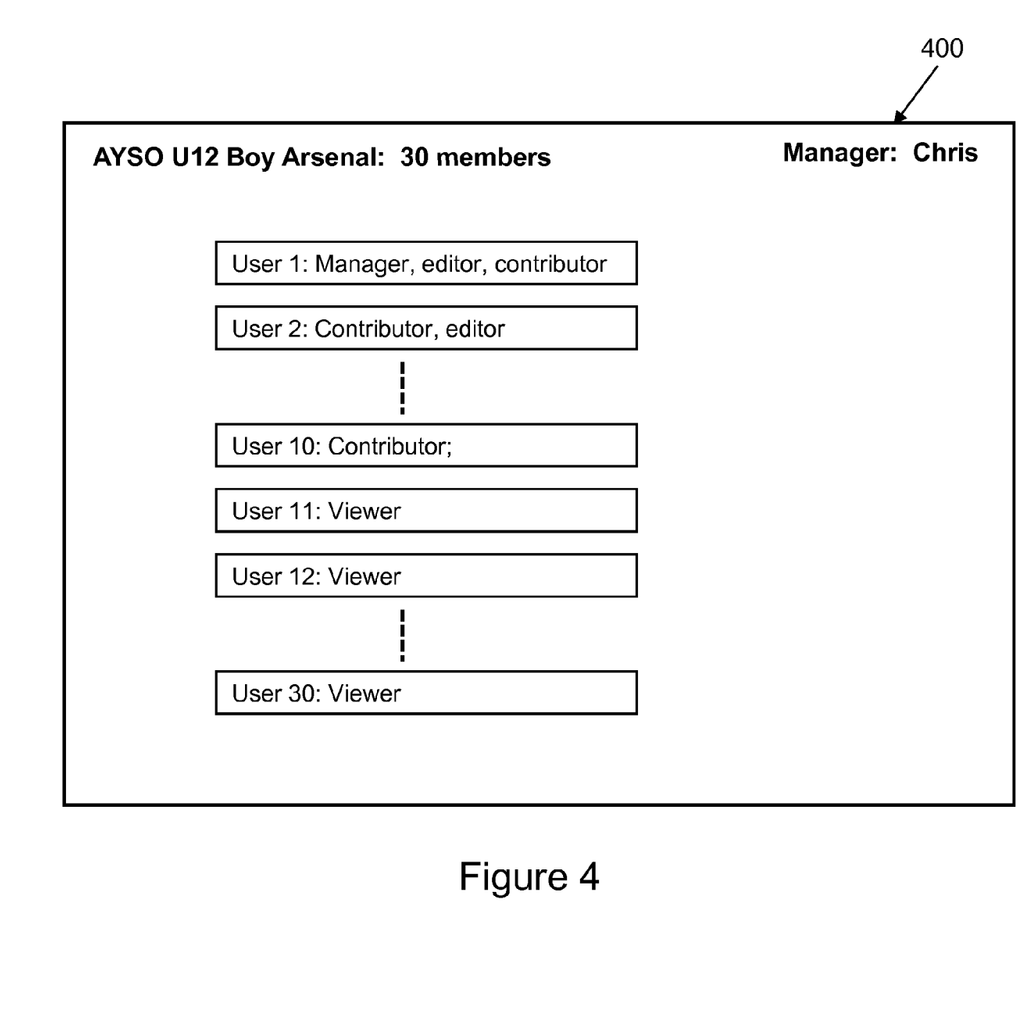
FIG. 4 shows an exemplified user interface user access control compatible with the authentication module of FIG. 2.

The user access-control module 133 (FIG. 2) allows the manager 111 to define the roles of the users for the share site. For example, referring to FIG. 4, a share site can be set up for a soccer team "AYSO U12 Boy Arsenal", which includes 30 members and is managed by a soccer dad Chris. The user access-control module 133 can support a user interface 400 to show Chris a list of users such as user 1, user 2 . . . , and user 30 in the share-site user group, and allow Chris to define the roles of each user. For example, user 1 can be Chris himself who is a manager, is allowed to edit, contribute to, and view the text, images, videos, and designs at the share site. User 2 can be another soccer parent named Saleem who has editing rights and also is a contributor of content to the share site. Similarly, user 10 is a contributor. Users 11-30 are viewers who are authorized to view content presented for Team Arsenal, but are not contributors or editors. The contributed content from the contributing users are stored in the share-site storage 150.

Figure 5:
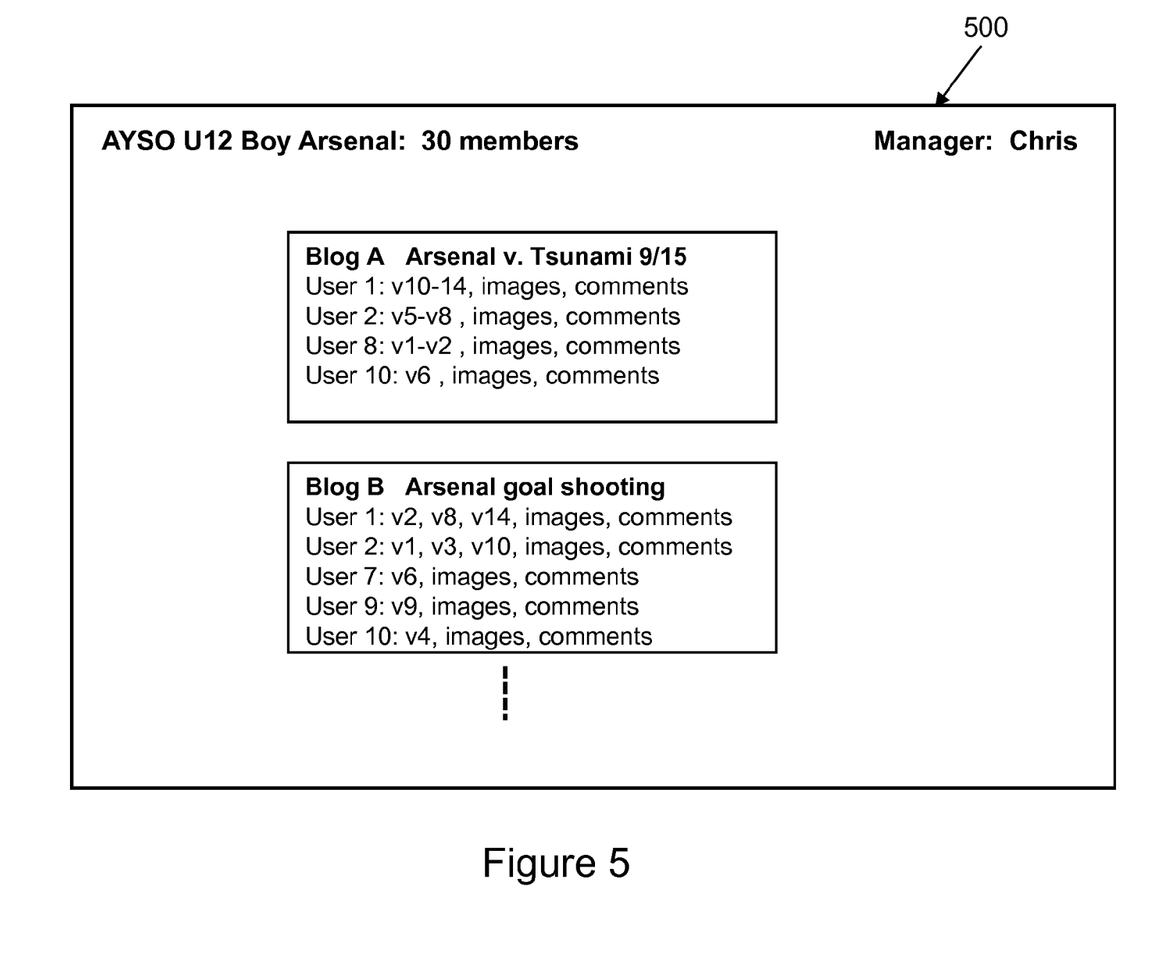
FIGS. 5 and 6 show exemplified user interfaces for share-site management compatible with the share-site management system of FIG. 1.

The share-site module 140 (FIG. 1) allows the manager 111 (i.e. the administrator) to manage the distribution of share-site content to a group of users. The manager 111 can flexibly assemble content, using a user interface 500 shown in FIG. 5, from different contributors into different Blogs, each of which may be about a specific event such as a soccer game or a team party. For example, Blog A can include pictures and video clips taken at a specific game played by Team Arsenal against another team Tsunami, which include video clips from user 1 (v10-v14), user 2 (v5-v8), user 8 (v1-v2), and user 10 (v6), and images and comments from different users. The manager can review and edit the content, and add captions and other information (e.g. names for different player numbers) to go into Blog A. The manager can also create a Blog B that highlights goal shooting scenes by Team Arsenal. Blog B can include images, video clips taken at different games, comments made by the users, and designs selected or made for the group of content.

Figure 6:
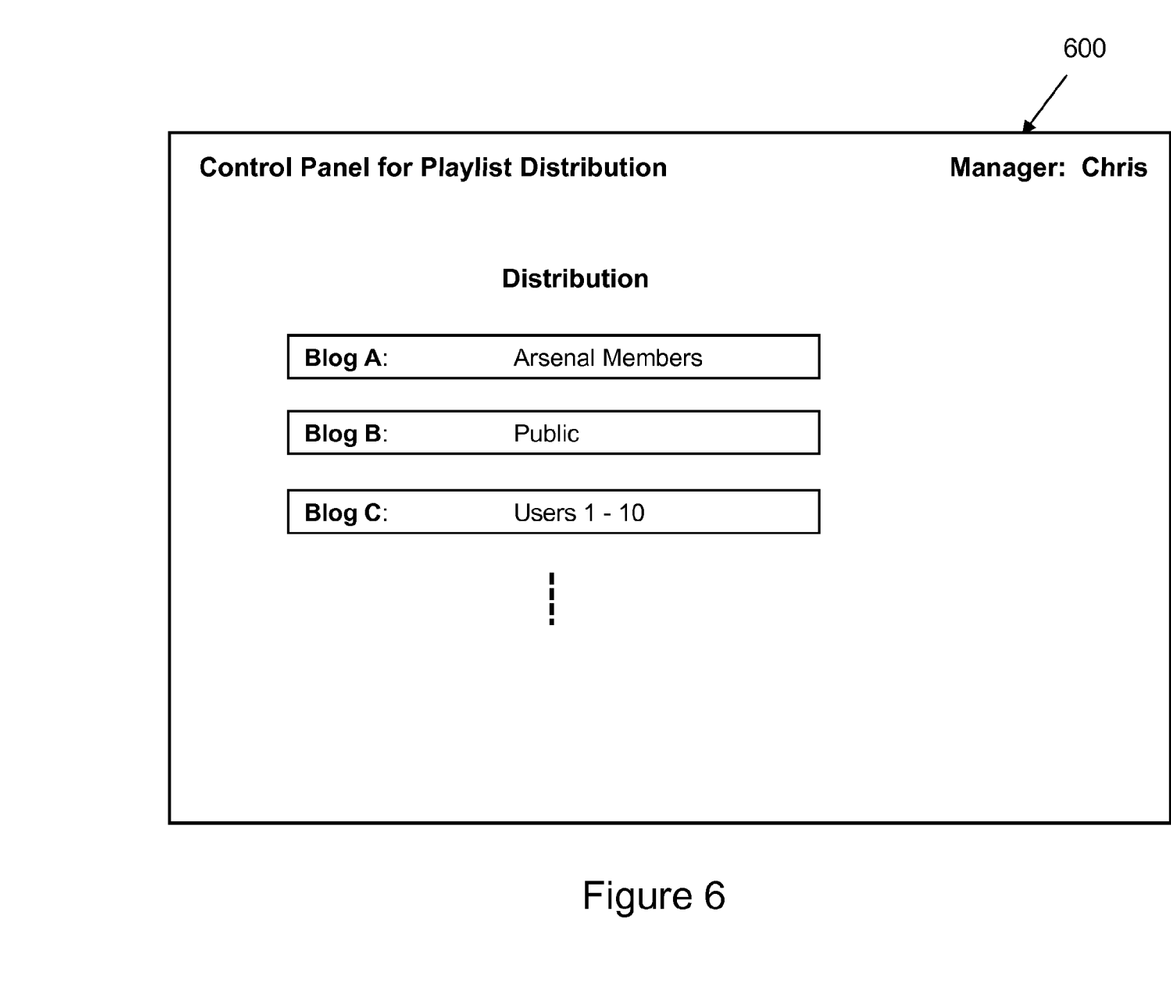

In some embodiments, the share-site module 140 allows the manager 111 to define the degree of privacy in the distribution and sharing for each Blog. For example, the manager 111 can define Blog A to be viewable by all and only the Arsenal members (i.e. user 1-user 30) at a user interface 600 shown in FIG. 6. Blog B can be made public to all users on the Internet. Blog C can be made viewable to only a subgroup (e.g. users 1-10) of the Arsenal members.

Once a Blog is created, the share-site module 140 creates a secure network token for the Blog to allow the Blog to be shared over a computer network. The token for the Blog can be a persistent key which provides a consistent and reliable way for users (viewers, contributors, or manager) to set up communications with the share site management system 110 using the respective user tokens (authenticated by the user authentication module 132, as described above).

To view a Blog, a viewer 113 operates a device to contact the application authentication module 131 identifying the user token and the token of the Blog that the viewer intends to view. The application authentication module 131 authenticates each form of applications 120. The user authentication module 132 authenticates the user token. The user access control module 133 authenticates the role of the viewer (viewing, contributing, editing etc.). Afterwards, the content in the Blog is presented to the viewer 113 according to the user's role (in the share-site group and specific to the Blog) defined in the user access control module 133.

Different users can access the Blog using their respective authenticated tokens from different applications. For example, a manager can use a table device or a smart phone to access the share site management system 110 to manage the content sharing in the user group for the share site. The manager can view content in the Blog using a web browser on a personal computer. Since the token for the Blog is persistent, the manager can access, view, or manage the share site management system 110 using his user token regardless the application format or platform of his device.

Each communication session can time out, for example, in one day or two days. The user tokens and the Blog tokens are persistent, which allows flexibility for the users to access the share site management system 110 at different times and using many different methods at the convenience to the users.

In accordance with the present invention, the behaviors of the email spammers were carefully analyzed for developing intelligence for spam prevention. The authentication module 130 further includes a spam control module 134 in communication with the spam intelligence module 135.

The spam intelligence module 135 stores one or more rules for identifying potential spam emails based on the spam behaviors, that is, spam detection rule(s) 136. Examples of the spam detection rule(s) 136, as described in more detail below, include a detection of email messages of substantially identical content, a determination about if those emails are sent by different share-site owners, and a determination of the number of those emails. The spam intelligence module 135 also stores one or more false alarm reduction rules 137 for reducing false alarms among the identified potential spam emails under the spam detection rule(s) 136. Examples of the false alarm reduction rules 137, as described in more detail below, include checking if the share-site owners of the potential spam emails have used the products and services of the share-site providers. The spam intelligence module 135 also stores logic in determining the most probably spam emails. The spam control module 134 is configured to prohibit the distribution of emails from certain share-site manager 111 if the behavior of the manager 111 or his email content fit the criteria defined by the rules 136, 137 and logic 138 in the spam intelligence module 135.

Figure 7:
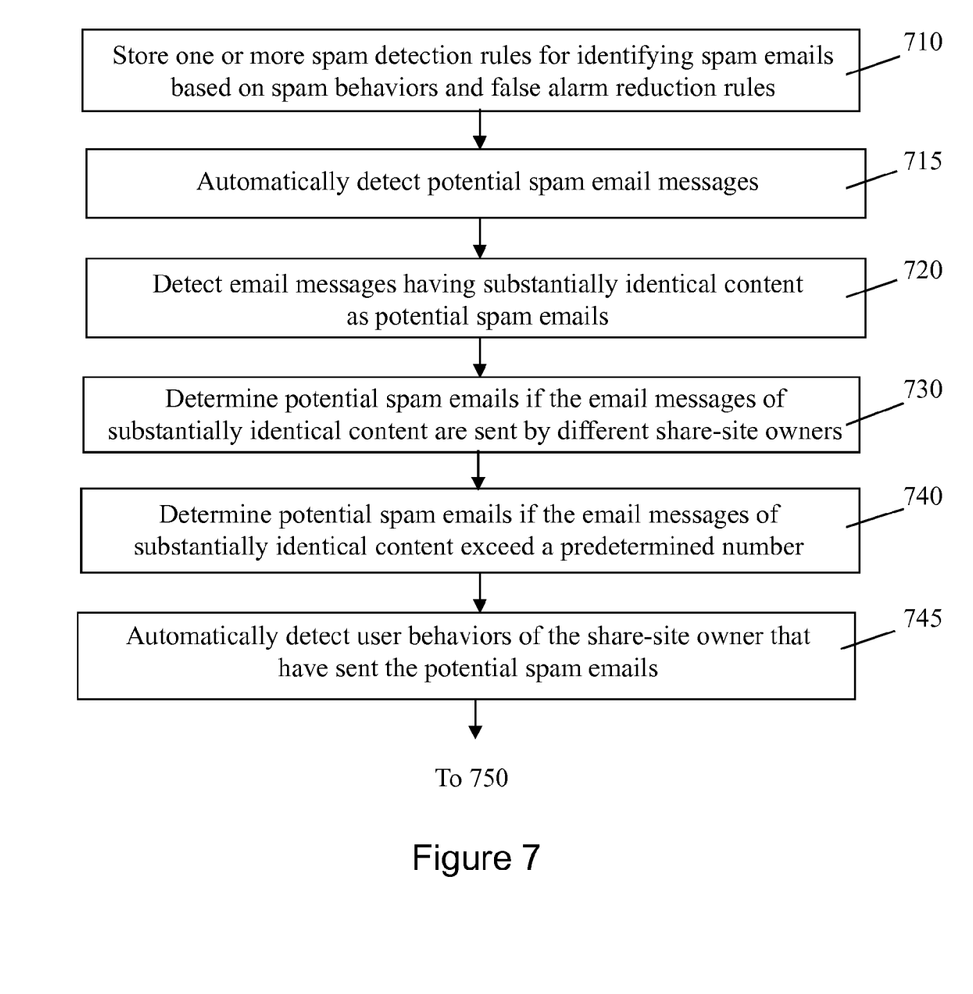
FIG. 7 is a flowchart for intelligently preventing spam emails at share sites in accordance with the present invention.

One common pattern discovered in the spamming emails is that they tend to comprise substantially the same content. The spammer often use copy and paste and to send the same messages to many users. Referring to FIGS. 2 and 7, the spam intelligence module 135 stores one or more spam detection rule(s) 136 to identify potential spam emails based on spam behaviors (step 710). The spam intelligence module 135 also stores one or more spam false alarm reduction rules 137 for reducing false alarms in the potential spam emails (step 710).

First, potential spam emails are automatically detected (step 715). In one implementation, the spam detection rule(s) 136 can guide spam intelligence module 135 to detect email messages of substantially identical content (step 720). This analysis can be applied to emails sent in a certain period of time (e.g. 1 month, 3 months, 6 months, 1 year etc.). The network-based computer system 100 often uses multiple servers 160 (FIG. 1) to send email messages from the owners of share sites. Emails from even one share-site owner are sometimes sent out over different servers 160 (FIG. 1). To detect spam messages, the email messages sent out from different servers are hashed and the content of these emails are compared. Email messages with substantially identical content are identifies. The email messages can be from the same share-site owner, or from different share site owners because spammers often register several free accounts and set up multiple share sites to send the same spam emails. To provide accurate comparison, extra spaces, blank lines, paginations may be removed in the emails. Words in the emails may be properly parsed for comparison purposes. Two emails can be considered to be of the same content if they both contain a predetermined number of identical words in a consecutive sequence.

Moreover, it was found that two share sites are probably owned by a same spammer if the two share-sites send out identical emails (that includes more than certain number of words). The spam detection rule(s) 136 allows the spam intelligence module 135 to make one or more of the following determinations. In some embodiments, if email messages of substantially identical content are sent by different share-site owners, those emails are determined to be more likely to be spam emails (step 730). If the email message sent by two different share-site owners contains sufficient number of words (e.g. more than 10 words), there is a good chance that the two share sites have been set up by a same spammer with false identities.

Another pattern of the spam messages is that spammers tend to send a large number of the same message (because many spammers are paid for the number of messages they send). Therefore, the spam detection rule(s) 136 can guide the spam intelligence module 135 to determine if such potential spam messages with the identical content are more than a predetermined number (step 740). Examples of the predetermined number can be 2, 4, 10, or 20, etc. A large number of spam emails were detected with this criterion. Limiting the maximum number of spam emails per day for each share site owner, however, did not significantly reduce spam emails. The spammers tend to send maximum number of emails allowed each day, probably from more freely set up accounts and associated share sites.

In the current studies by the present inventor, it is found that the spam detection rule(s) 136 alone often create intolerable level (e.g. 3-9%) of false alarms. Some share-site users have legitimate needs to send a large number of identical email messages to other users. For example, a soccer coach may send an identical announcement email to multiple users about an event or about new content on the share site.

Next, the behaviors of the share-site owners who sent potential spam emails are automatically detected (step 745). In some embodiments, the false alarm reduction rules 137 guides the spam intelligence module 135 to determine if the share-site owner that sent multiple messages with identical content has previously uploaded images or video clips to his/her account (step 750). The image or video upload can be for sharing at the share site or for other image products or services provided by the service provider. This criterion is based on the finding that spammers do not use the services of the network-based computer system 100 because it may expose their identities. So if the share-site owner has not uploaded images into his/her account before, the share-site owner is more likely to be a spammer. Otherwise, the share-site owner is almost certainly not a spammer.

Providers of share-sites often also provide other products and services. For example, Shutterfly, Inc. allows users to design and order a range of image products such as photobooks, calendars, and cards using users own pictures. In some embodiments, the false alarm reduction rules 137 can determine false alarms based on user's behaviors in product or service ordering from the network-based computer system 100 (step 760). If the share-owner that sent multiple messages with identical content has not previously ordered image products in his/her account, the share-site owner is more likely to be a spammer (step 760). Spammers almost never order products to reveal their true identities by disclosing payment and address information. If the share-site owner has ordered products previously, the share-site owner is determined to be not a spammer.

If a share-site owner has uploaded images or videos or ordered products in his/her account (as discussed in connection with steps 750 and 760), the corresponding potential emails are identified as false alarm emails (step 770). The corresponding share-site owner who sent the emails is determined not to be spammers because spammer almost always wants to remain anonymous (step 770). The share-site owner will continue to be allowed from his/her share site. As a result of checking the upload and product order history of the share-site owner, false positives are significantly reduced. The false alarms are then removed from the potential spam emails to produce a list of spam emails (step 780) by the spam control module 134 (FIG. 2). The share-site owners who sent the identical messages are determined to be spammers, and will disallowed from sending email messages from their share site(s) (step 790) by the spam control module 134 (FIG. 2). Optionally, his/her account may be suspended. In one study, the above described method was found to reduce spam emails from 30% to 1% with minimal false positives on the legitimate messages from the share sties.

It should be noted that once the spam detection rules 136 and the false alarm reduction rules 137 are set up, the detection of potential emails and the removal of false alarms can be performed automatically by various components of the network-based computer system 100.

In some embodiments, the spam indication and false alarm reduction can be quantitatively modified according to the logic 138 stored in the spam intelligence module 135 (FIG. 2). For example, the logic 138 can quantitatively define the degree of sameness between potential spam emails (as in step 720). The logic 138 can also define the minimum number of emails that have substantially identical content to be considered as potential spam emails (as in step 740). The logic 138 can further define the types of user behaviors to be checked to reduce false alarms (as in steps 750-760).

It should also be noted that the detailed configurations and steps can differ from the examples described above without deviating from the spirit of the present invention. For example, the modules and components in the network-based computer system 100 can exist in different configurations. The sequence of spam detection rules and the false positive reduction rules may be changed while achieving the intended results. False positive reduction can be based on other products and services provided by the share site provider than the examples used above.

What is claimed is:

1. A computer-implemented method for preventing spam emails from a share site, comprising:
    receiving registrations from users to set up share sites by a network-based computer system, wherein the users become owners of the share sites;
    enabling the users to send emails to invite people to become members of their respective share sites;
    allowing the users to order at least one product or service from the network-based computer system;
    storing one or more spam detection rules in the network-based computer system;
    detecting potential spam emails among the email sent by the users based on the one or more spam detection rules by the network-based computer system;
    storing one or more false alarm reduction rules in the network-based computer system;
    automatically detecting, by the network-based computer system, behaviors of one or more senders of the potential spam emails at the share-site;
    identifying false positive emails in the potential spam emails based on the one or more false alarm reduction rules and the behaviors of the one or more senders of the potential spam emails at the share-site, which comprises at least:
        determining if the one or more senders of the potential spam emails have ordered the at least one product or service from the network-based computer system;
    removing false positive emails from the potential spam emails to produce a list of verified spam emails;
    identifying a first sender of the list of verified spam emails as a spammer; and
    prohibiting the spammer from sending emails from one or more share sites owned by the spammer at the network-based computer system.

2. The computer-implemented method of claim 1, wherein the step of detecting potential spam emails based on the one or more spam detection rules comprises:
    detecting email messages having substantially identical content.

3. The computer-implemented method of claim 2, wherein the step of detecting potential spam emails based on the one or more spam detection rules comprise:
    determining if substantially identical content in the email messages contain more than a predetermined number of words.

4. The computer-implemented method of claim 2, wherein the step of detecting potential spam emails based on the one or more spam detection rules comprise:
    determining, by the network-based computer system, if the email messages having substantially identical content are sent from different share sites.

5. The computer-implemented method of claim 2, wherein the step of detecting potential spam emails based on the one or more spam detection rules comprise:
    determining if the email messages having substantially identical content exceed a predetermined number.

6. The computer-implemented method of claim 2, wherein the network-based computer system includes a plurality of servers, wherein the step of detecting potential spam emails based on the one or more spam detection rules comprise:
    detecting email messages having substantially identical content at two or more of the plurality of servers.

7. The computer-implemented method of claim 1, wherein the step of automatically detecting comprises:
    determining if the one or more senders of the potential spam emails have uploaded at least one image or video clip to the network-based computer system.

8. The computer-implemented method of claim 7, further comprising:
    determining a second sender to be not a spammer if the second sender has uploaded images to the network-based computer system; and
    assigning emails sent by the second sender as false positive emails.

9. The computer-implemented method of claim 1, further comprising:
    if the one or more senders of the potential spam emails have ordered at least one product or service from the network-based computer system, assigning emails of a second sender as false positive emails if the second sender has ordered products or services from the network-based computer system.

10. The computer-implemented method of claim 1, wherein the behaviors comprises uploading at least one image or video clip to the network-based computer system, or ordering at least one product or service from the network-based computer system.

11. A network-based computer system for facilitating share sites, comprising:
one or more servers comprising computer processors configured to receive registrations from users to set up share sites and to become owners of the share sites, to enable the users to send emails to invite people to become members of their respective share sites, and to allow the users to order at least one product or service from the network-based computer system,
wherein the one or more servers are configured to store one or more spam detection rules in a spam intelligence module and to detect potential spam emails among the email sent by the users based on the one or more spam detection rules,
wherein the one or more servers are configured to store one or more false alarm reduction rules in the spam intelligence module, to automatically detect behaviors of one or more senders of the potential spam emails at the share-site, and to identify false positive emails in the potential spam emails based on the one or more false alarm reduction rules and the behaviors of the one or more senders of the potential spam emails at the share-site, which comprises at least determining if the one or more senders of the potential spam emails have ordered the at least one product or service from the network-based computer system,
wherein the false positive emails are removed from the potential spam emails to produce a list of verified spam emails,
wherein the one or more servers are configured to identify a first sender of the list of verified spam emails as a spammer and to prohibit the spammer from sending emails from one or more share sites owned spammer.

12. The network-based computer system of claim 11, wherein the spam intelligence module detects email messages having substantially identical content to detect potential spam emails.

13. The network-based computer system of claim 12, wherein the spam intelligence module detects potential spam emails by determining if the substantially identical content in the email messages contain more a predetermined number of words.

14. The network-based computer system of claim 12, wherein the spam intelligence module detects potential spam emails by determining if the email messages having substantially identical content are sent from different share site.

15. The network-based computer system of claim 12, wherein the spam intelligence module detects potential spam emails by determining if the email messages having substantially identical content exceed a predetermined number.

16. The network-based computer system of claim 12, wherein the spam intelligence module detects potential spam emails by detecting email messages having substantially identical content at two or more of the servers.

17. The network-based computer system of claim 11, wherein the one or more servers are configured to determine if the one or more senders of the potential spam emails have uploaded at least one image or video clip to the network-based computer system.

18. The network-based computer system of claim 17, wherein the one or more servers are configured to determine a second sender to be not a spammer if the second sender has uploaded images to the network-based computer system and to assign emails sent by the second sender as false positive emails.

19. The network-based computer system of claim 17, wherein the one or more servers are configured to assign emails of a second sender as false positive emails if the second sender has ordered at least one product or service from the network-based computer system.

20. The network-based computer system of claim 11, wherein the one or more servers are configured to enable users that are not spammers to publish the content at the share sites and to send emails from the share sites.

* * * * *